United States Patent [19]
Higuchi

[11] Patent Number: 5,904,064
[45] Date of Patent: May 18, 1999

[54] CAM ASSEMBLY FOR USE IN A PRESSING MACHINE

[75] Inventor: Masahiro Higuchi, Tokyo, Japan

[73] Assignee: Sankyo Oilless Industry, Inc., Tokyo, Japan

[21] Appl. No.: 08/972,414

[22] Filed: Nov. 18, 1997

[30]     Foreign Application Priority Data

Feb. 25, 1997  [JP]  Japan .................................. 9-040652

[51] Int. Cl.$^6$ ................................ B21D 5/04; B26D 5/16
[52] U.S. Cl. ............................ 72/452.9; 72/381; 72/304; 72/315; 83/635
[58] Field of Search .................................. 72/452.9, 381, 72/383, 313–315; 83/588, 623, 635

[56]           References Cited

U.S. PATENT DOCUMENTS

| | | | |
|---|---|---|---|
| 5,101,705 | 4/1992 | Matsuoka ................................ | 72/452.9 |
| 5,231,907 | 8/1993 | Matsuoka ................................ | 72/452.9 |
| 5,269,167 | 12/1993 | Gerhart ................................ | 72/452.9 |
| 5,487,296 | 1/1996 | Gerhart et al. ........................ | 72/452.9 |
| 5,711,180 | 1/1998 | Sasahara et al. ...................... | 72/452.9 |

*Primary Examiner*—David Jones
*Attorney, Agent, or Firm*—Nikaido, Marmelstein, Murray & Oram LLP

[57]           ABSTRACT

Disclosed is an improvement in a cam assembly for use in a pressing machine having a lower cam to be fixed to the base of the pressing machine, a spring-biased sliding cam whose front surface is allotted to fix a machining tool and a cam holder to be fixed to the upper frame of the pressing machine. The sliding cam is operatively combined with the lower cam to slide on the inclined surface of the lower cam synchronously with the rising and descending of the upper frame of the pressing machine, whereas the cam holder and the sliding cam is so combined as to leave a predetermined space defined therebetween, thereby permitting the sliding cam to be slidably held in the cam holder. The cam assembly further has a spacer to be inserted in the predetermined space and detachable fastening means to fix the sliding cam to the cam holder as if the slider were like with the upper frame of the pressing machine staying at its lower dead end. A required machining to be effected on the tool mount of the sliding cam for changing the machining tool can be advantageously effected in situ without disassembling the cam assembly.

2 Claims, 4 Drawing Sheets

CAM ASSEMBLY FOR USE IN A PRESSING MACHINE

BACKGROUND OF THE INVENTION

1. Field of the Invention

The present invention relates to a cam assembly for use in a pressing machine to permit a piercing punch or any other machining tool to effect a required pressing or machining on a workpiece, which cam assembly can reciprocate the metal mold or machining tool laterally or obliquely in synchronous with the rising and descending of the upper frame of the pressing machine.

2. Description of Related Art

A certain pressing machine is capable of conducting different workings such as bending, cutting and boring in a single pressing step, and such a pressing machine is equipped with a cam mechanism to permit a selected machining tool to reciprocate laterally or obliquely in synchronous with the rising and descending of the upper frame of the pressing machine. Referring to FIG. 4, the pressing machine has a lower metal mold 2a fixed to its stationary base 1 and an upper metal mold 2b fixed to its rising-and-lowering frame 3, and it has a cam assembly "C" arranged adjacent to the metal mold 2 for converting the rising-and-lowering movement of the frame 3 to the oblique movement to be given to the machining tool.

Referring to FIGS. 5 and 6, such a cam assembly "P" comprises a lower cam 4 to be fixed to the stationary base 1 of the pressing machine (see FIG. 4), a sliding cam 5 slidably coupled to the lower cam 4 and a cam holder 6 slidably coupled to the sliding cam 5 to slidably hold the same. The lower cam 4 has an inclined surface 4a formed on its top. As shown in FIG. 5, the inclined surface 4a has a plurality of recesses made thereon and filled with solid lubricant material to provide an oilless-lubricated surface. The sliding cam 5 has a machining tool (not shown) to be mounted to its front surface, and it has a slider 7 fixed on its rear inclined surface. The slider 7 has a plurality of recesses made thereon and filled with solid lubricant material to provide oilless-lubricated surfaces, thereby assuring that the sliding cam 5 can slide smoothly in the cam holder 6. As seen from FIG. 6, the slider 7 has two longitudinal recesses opening at its upper side, and two coiled springs 8 are inserted in these longitudinal recesses, thereby biasing the sliding cam 5 obliquely downward to the initial stress-free position as shown in FIG. 6.

The cam holder 6 is fixed to the upper frame of the pressing machine, and the cam holder 6 and the sliding cam 5 are so combined as to leave a predetermined space defined therebetween, thereby permitting the sliding cam 5 to be movably held in the cam holder 6. The sliding cam 5 is operatively combined with the lower cam 4 to reciprocate on the inclined surface 4a of the lower cam 4 synchronously with the rising and descending of the upper frame 3 of the pressing machine. Thus, the rising and descending of the upper frame 3 of the pressing machine is converted to the oblique reciprocation of the sliding cam 5 on the lower cam 4.

The sliding cam 5 has a machining tool such as a piercing punch mounted to its front surface 5a as seen from FIG. 4. Such a machining tool can be reciprocatingly moved to and from a workpiece on the pressing stage to effect a required machining such as bending or boring on the workpiece. In pressing, first the upper frame 3 of the pressing machine is lowered along with the cam holder 6 and the associated sliding cam 5, and when the sliding cam 5 abuts on the inclined surface 4a of the lower stationary cam 4, the sliding cam 5 is made to start from the initial stress-free position, moving the predetermined space obliquely upward in the cam holder 6 while compressing the coiled springs 8, which are placed between the cam holder 6 and the slider 7. Then, the sliding cam 5 moves obliquely downward on the inclined surface 4a of the lower cam 4 so that the machining tool may be put in working position relative to the workpiece to effect a required machining such as bending or boring.

Here, it should be noted that the front surface 5a of the sliding cam 5 must be subjected to a required machining to permit the mounting of a selected machining tool thereto (for instances, tapped holes or knock-out pin holes must be made in the front surface 5a of the sliding cam 5). The front surface 5a of the sliding cam 5, therefore, must be subjected to such a machining every time the machining tool is changed.

Disadvantageously such a required machining cannot be effected without disassembling and separating the sliding cam 5 from the cam assembly. If such a required machining is effected on the front surface 5a of the sliding cam 5 in situ, it would move under the resilient influence exerted by the springs 8 when a machining force is applied thereto. The tool-mounting surface 5a, therefore, is too unstable in position to permit the machining thereon. Thus, the required machining is, in fact, effected on the sliding cam 5 after removing it from the cam assembly. This, however, is a tedious, time-consuming work: disassembling the cam assembly to remove the sliding cam 5; machining the sliding cam 5; assembling the so machined sliding cam 5 and associated parts into a cam assembly; setting the cam assembly in position in the pressing machine; and making fine adjustments or trimmings on the machined areas of the tool-mounting surface 5a. The sliding cam 3 is heavy, for instance, 20 kilograms in weight, and the springs 8 when compressed exert a relatively strong force, for instance, beyond 60 or more kilograms. The weight and the counter force make the work still more difficult.

SUMMARY OF THE INVENTION

In view of the above one object of the present invention is to provide an improved cam assembly for use in a pressing machine, which cam assembly structure permits the tool-mounting surface of the cam assembly to be machined for mounting a selected tool thereon without disassembling the cam assembly.

To attain this object a cam assembly for use in a pressing machine comprising: a lower cam to be fixed to the base of the pressing machine, said lower cam having an inclined surface formed on its top; a sliding cam whose front surface is allotted to fix a machining tool, said sliding cam being operatively combined with said lower cam to slide on the inclined surface of aid lower cam synchronously with the rising and descending of he upper frame of the pressing machine; a cam holder to be fixed to the upper frame of the pressing machine, said cam holder and said sliding cam being so combined as to leave a redetermined space defined therebetween, thereby permitting said sliding cam to be slidably held in said cam holder; and springs to bias said sliding cam toward the initial stress-free position, is improved according to the present invention in that it further comprises a spacer to be inserted in said predetermined space and detachable fastening means to fix said sliding cam to said cam holder in the same position as said sliding cam is with the upper frame of the pressing machine staying at its lower dead end.

To simulate the situation in which the cam assembly is when the frame of the pressing machine is lowered to its lower dead end, the spacer is inserted in the predetermined space between the cam holder and the sliding cam, and then, the sliding cam is pushed back toward the closed end of the cam holder to fasten the sliding cam with the fastening means in fixed stable position, so that a required machining may be effected on the tool mounting surface of the sliding cam.

The fastening means may include bolts and locking nuts and a stopper plate to be fixed to the sliding cam. The stopper plate may have tapped holes made therein to allow the bolts to be driven in the tapped holes, thereby pushing the sliding cam apart from the initial stress-free position until the sliding cam has reached its upper dead end, and then, the sliding cam is fixedly held there by locking the bolts to the stopper plate with the locking nuts.

As described above, the spacer is inserted in the predetermined space between the cam holder and the sliding cam, particularly between the closed end of the cam holder and the counter side of the sliding cam on which the spring recesses open. This has the effect of preventing the sliding cam from moving a very short distance even if a strong force should be applied thereto. If not, the sliding cam would move slightly because there may be left a significant play attributable to the remaining resilience of the springs although the springs may be compressed almost completely in the situation in which the sliding cam has reached its dead end.

After mounting a selected machining tool to the sliding cam the spacer and the bolts and locking nuts are removed. Thus, the machining tool can be mounted on the sliding cam in situ, thereby facilitating fine adjustments in mounting the tool in correct position, finally leading to precision machining on a workpiece.

Other objects and advantages of the present invention will be understood from the following description of a cam assembly according to a sole embodiment of the present invention, which is shown in accompanying drawings.

DESCRIPTION OF THE PREFERRED EMBODIMENTS

Figure 1:
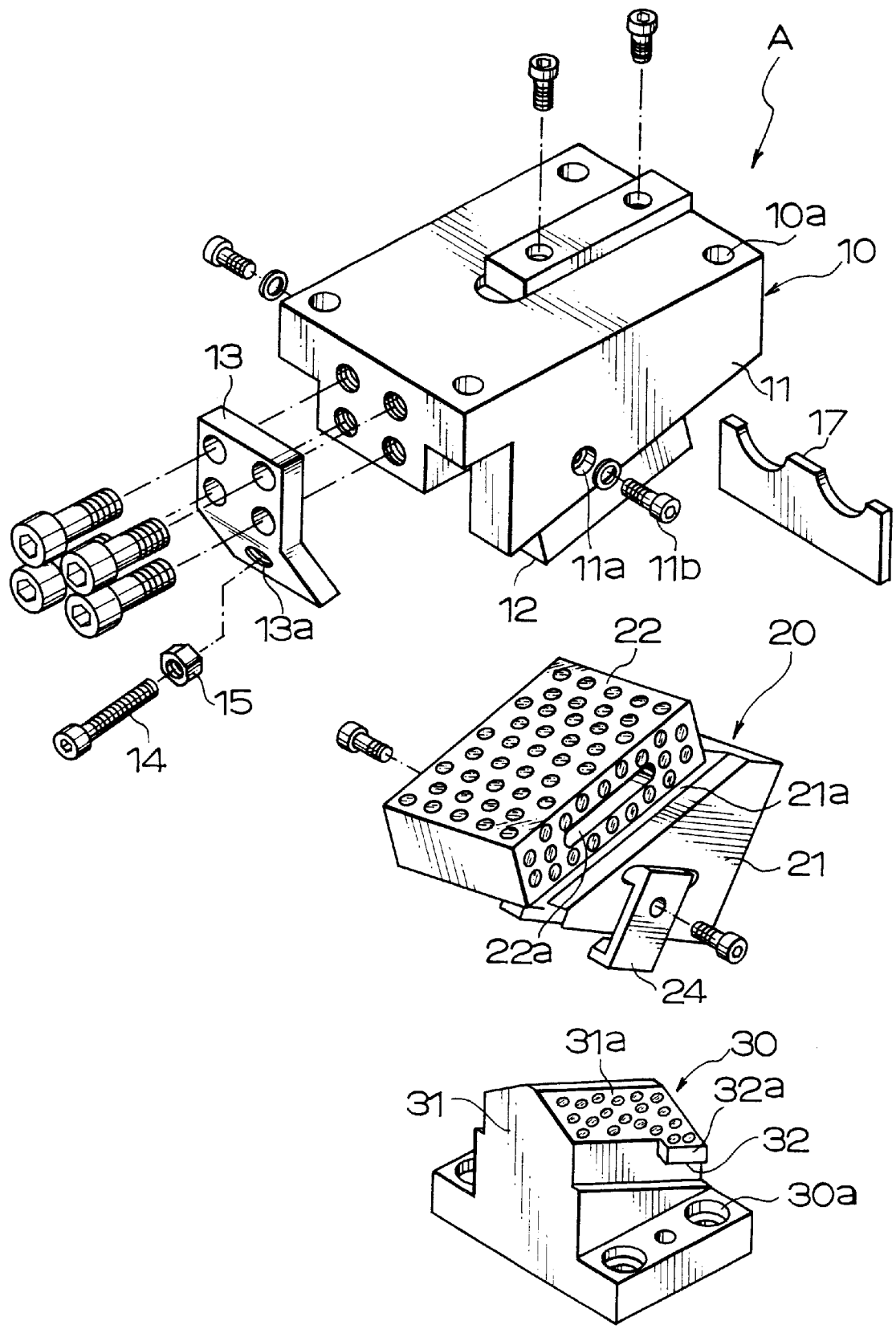
FIG. 1 is an exploded view of a cam assembly according to the present invention.

Referring to FIGS. 1 to 4, a cam assembly A for use in a pressing machine according to the present invention comprises a lower cam 30 to be fixed to the base 1 of the pressing machine (see FIG. 4), a sliding cam 20, and a cam holder 10 to be fixed to the upper frame 3 of the pressing machine.

The sliding cam 20 comprises a cam body 21 whose front surface is allotted to fix a machining tool such as a piercing punch, and a slider 22 bolted to the cam body 21. The cam body 21 has opposite notched edges to form guide slots 21a with the overlying slider 22 (see FIG. 3). As seen from FIGS. 2 and 3, the slider 22 has cylindrical recesses 22b and 22b to accomodate coiled springs 23. Also, the slider 22 has numerous recesses filled with lubricant material to provide oilless lubricant surfaces on its top and opposite sides, and the slider 22 has opposite longitudinal slots 22a to slidably accomodate bolts, which will be inserted therein after being combined with the cam holder 10, as later described.

The cam holder 10 comprises a ceiling plate having holes 10a made at its corners for bolting the cam holder 10 to the upper frame 3 of the pressing machine, opposite inclined walls 11, 11 depending from the opposite sides of the ceiling plate, and an end wall 11c integrally connected to the opposite inclined walls 11, 11, thereby defining along with the opposite inclined walls 11, 11 a space to slidably accomodate the slider 22 of the sliding cam 20. Specifically guide plates 12, 12 are bolted to the lower surfaces of the opposite walls 11, 11 (see FIG. 3). These guide plates 12, 12 extend inward to fit in the opposite guide slots 21a, 21a of the sliding cam 20, thereby slidably holding the sliding cam 20. The opposite walls 11, 11 have tapped holes 11a made thereon to insert bolts 11b 11b until their tips enter the longitudinal slots 22a of the slider 22, thereby defining the stroke of the sliding cam 20.

The cam holder 10 has a stopper plate 13 bolted to one end of the cam holder 10 (left end in FIG. 2), which one end delimits one of the terminal ends of the stroke of the sliding cam 20.

Figure 2:
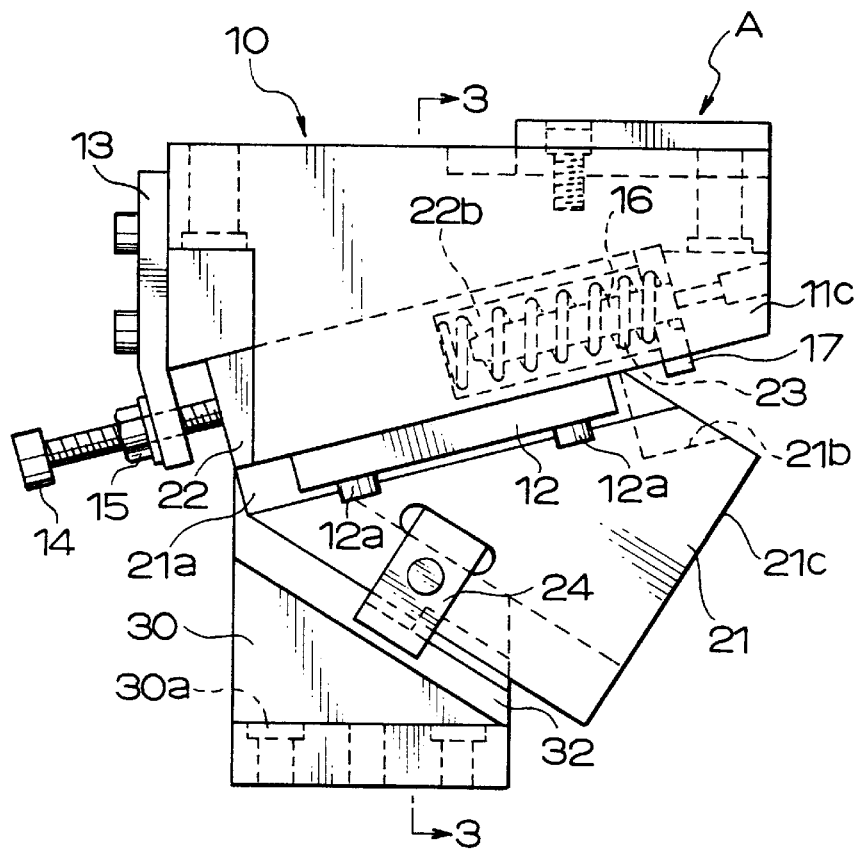
FIG. 2 is a side view of the cam assembly with its sliding cam in fixed position.

As shown in FIG. 2, the lower portion of the stopper plate 13 is so bent that it extends perpendicular to the slider 22, thereby providing the function of stopping the slider 22. The lower portion of the stopper plate 13 has a tapped hole 13a at its center to permit a push bolt 14 to threadedly engage. When the push bolt 14 is driven, the slider 22 will be pushed upward. As seen from FIGS. 1 and 2, the push bolt 14 can be locked to the stopper plate 13 with the locking nut 15 thereby preventing the loosening of the push bolt 14 in the stopper plate 13.

Figure 3:
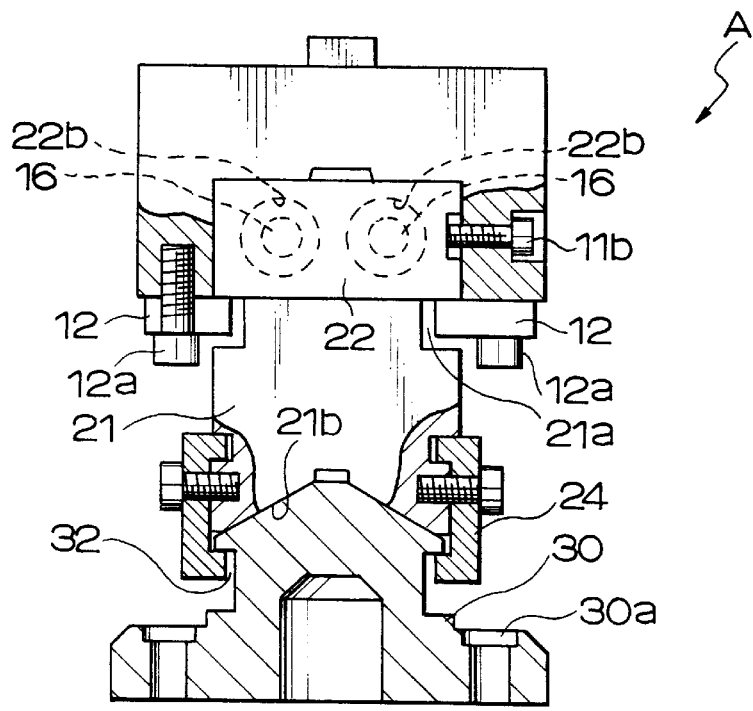
FIG. 3 is a sectional view of the cam assembly taken along the line 3—3 in FIG. 2.
Figure 4:
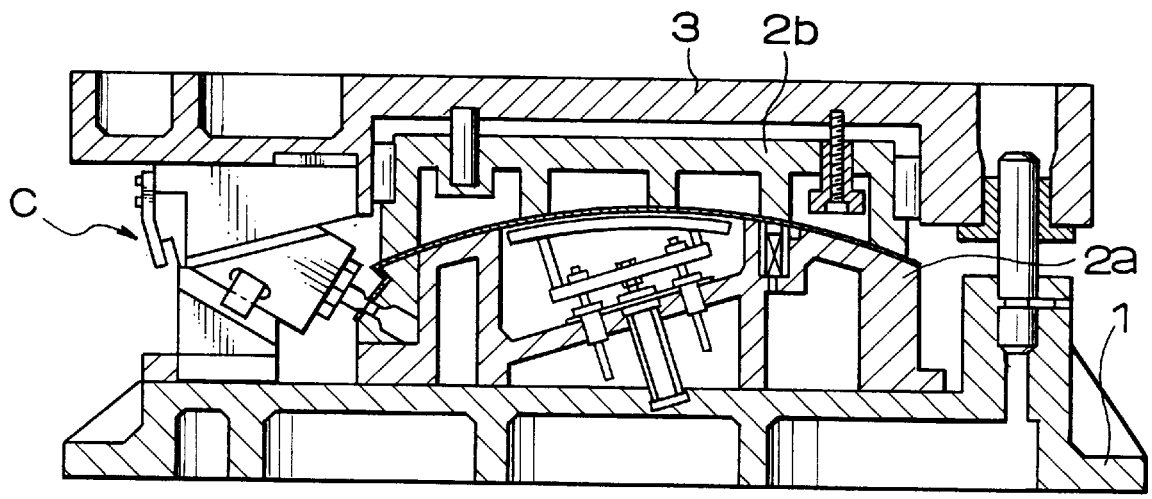
FIG. 4 shows how the cam assembly is fixed in the pressing machine.
Figure 6:
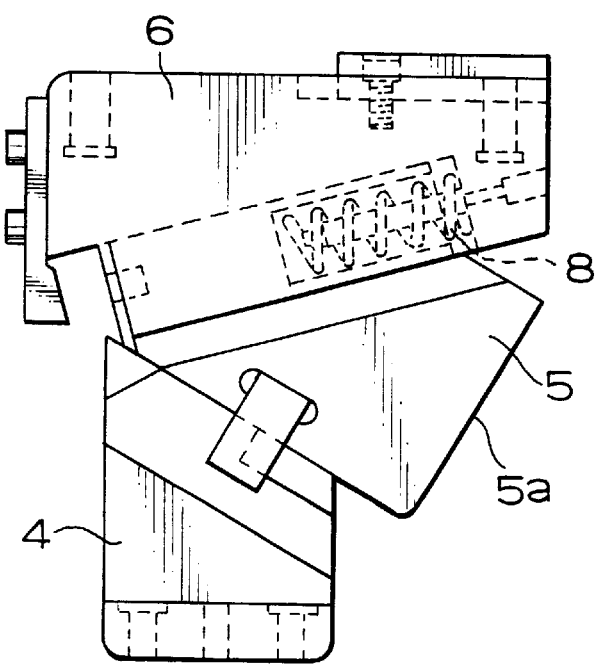
FIG. 6 is a side view of the conventional cam assembly.
Figure 5:
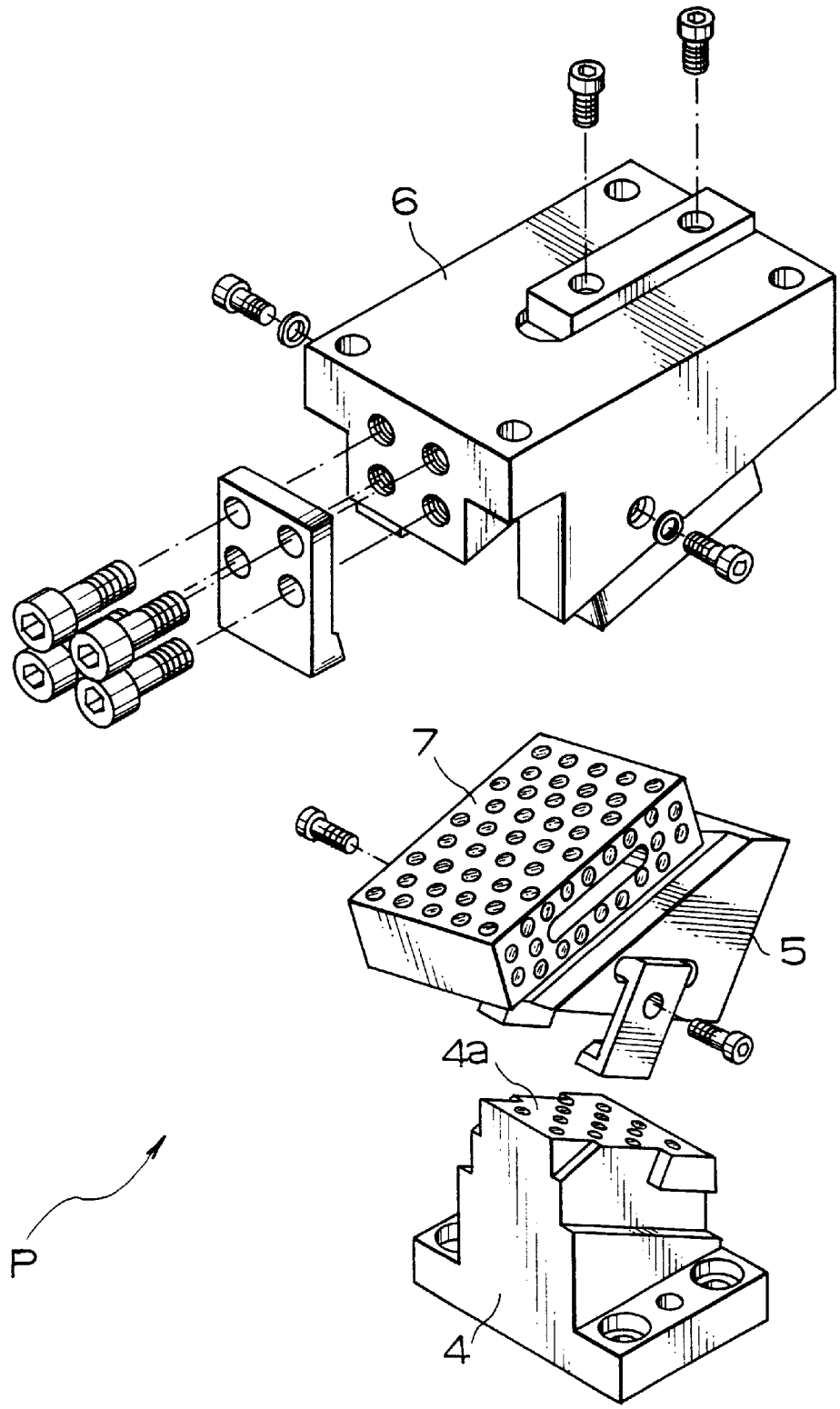
FIG. 5 is an exploded view of a conventional cam assembly.

The cam holder 10 has two spring guide pins 16, 16 projecting from its end wall 11c to confront the longitudinal cylindrical recesses 22b, 22b of the slider 22 (see FIGS. 2 and 3). These spring guide pins 16, 16 have the effect of preventing the coiled springs 23 from being deformed inward in the longitudinal cylindrical recesses 22b, 22b of the slider 22. Thus, the end wall 11c of the cam holder 10 provides a stationary abutment for the coiled springs 23 to apply their resilient forces to the slider 22 obliquely downward.

The sliding cam 20 has a recess 21b notched on its upper side in front of the end wall 11c of the cam holder 10, thereby permitting a spacer 17 to be inserted between the slider 22 and the end wall 11c of the cam holder 10 by hand. The spacer 17 has two semicircular cuts large enough not to touch the spring guide pins 16 and the springs 23. The spacer 17 may be made of a metal or hard synthetic resin.

The lower cam 30 comprises a flat base and a driving block 31 integrally connected to the flat base. The flat base has holes 30a made at its corners to fasten the lower cam 30 to the base 1 of the pressing machine with bolts (see FIG. 4). The driving block 31 has an inverted "V"-shaped top. The inverted "V"-shaped top has two opposite inclined guide surfaces 31a, 31a to fit in the inverted "V"-shaped slot of the lower surface 21b of the sliding cam body 21. These guide surfaces 31a, 31a provide oilless-lubricated planes to assure that the sliding cam body 21 can move smoothly on the inverted "V"-shaped top of the lower cam 30.

The driving block 31 of the lower cam 30 has lateral expansions 32a formed on the opposite descendent ends of the driving block 31, thus providing return guide slots 32 whereas the sliding cam body 21 has return guide arms 24 bolted to its opposite sides. Assuming that the sliding cam 20 is lowered, the hook ends of the return guide arms 24 slide along the opposite sides of the driving block 31 until the lower surface 21b of the sliding cam 20 rides on the opposite inclined guide surfaces 31a, 31a of the driving block 31, and then, the sliding cam 20 starts sliding on the driving block 31 obliquely downward. Then, the hook ends of the return guide arms 24 enter the guide slots 32 when the sliding cam 20 has come close to its lower dead end. After finishing a required pressing work the upper frame 3 of the pressing machine starts rising, making the hook ends of the return guide arms 24 to climb upward along the return guide slots 32, and when the hook ends of the return guide arms 24 comes out of the return guide slots 32, where no lateral expansions overhang the way, permitting the rising of the return guide arms 24, and hence the sliding cam 20.

In synchronous with the lowering and rising of the upper frame 3 of the pressing machine the cam assembly works as follows:

First, assuming that the upper frame 3 of the pressing machine starts lowering, the cam holder-and-sliding cam combination start lowering, and the lower surface 21b of the sliding cam 20 rides on the opposite inclined guide surfaces 31a, 31a of the inverted "V"-shaped top of the driving block 31 of the lower cam 30. Then, the slider 22 of the sliding cam 20 is made to climb upward in the cam holder 10 while compressing the coiled springs 23. When the slider 22 reached the upper dead end, the sliding cam 20 starts moving obliquely downward on the inverted "V"-shaped top of the driving block 31. In the vicinity of lower dead end a required machining such as boring or bending is effected on a workpiece.

After termination of pressing at the lower dead end of the upper frame 3 of the pressing machine the counter force to the springs 23 exerted by the slider 22 is released, and then, the hook ends of the return guide arms 24 is made to climb upward along the return guide slots 32, and when the hook ends of the return guide arms 24 comes out of the return guide slots 32, where no lateral expansions overhang the way, permitting the rising of the return guide arms 24, and hence of the sliding cam 20, as described earlier. Thus, the sliding cam 20 is allowed to return to its initial stress-free position.

In changing the machining tool at the tool mount of the sliding cam body 21, first, the bolt 14 is inserted in the tapped hole 13a of the stopper plate 13, and the slider 22 is pushed obliquely upward by driving the bolt 14. Then, the spacer 17 is inserted between the slider 22 and the end wall 11c of the cam holder 10, and the bolt 14 is fastened to the stopper plate 13 with the locking nut 15. Thus, the sliding cam 20 is locked, and then a required machining is effected on the front surface of the sliding cam body 21 for mounting a new machining tool.

The spacer 17 occupies the 5 to 10 milimeter-long play between the slider 22 and the end wall 11c of the cam holder 10, thereby preventing the sliding cam 20 from moving this distance of play to keep the sliding cam 20 still in the same condition as it is with the upper frame 3 staying at its lower dead point. This is most advantageous to the final trimming or adjustments in putting the machining tool in correct position relative to a workpiece on the pressing stage of the pressing machine.

After mounting the new machining tool to the sliding cam 20 the locking nuts are loosened, and removed, and the bolts 14 and the spacer 17 are removed.

The cam assembly described above can be modified without departing the spirit of the present invention, as for instance, a pushing-in and rotating type locking means may be used in place of the locking bolt-and-nut.

What is claimed is:

1. A cam assembly for use in a pressing machine having a base and an upper frame, said cam assembly comprising: a lower cam to be fixed to the base of the pressing machine, said lower cam having a top and an inclined surface formed on said top; a sliding cam having a front surface for mounting a machining tool, said sliding cam being operatively combined with said lower cam to slide on the inclined surface of said lower cam synchronously with rising and descending of the upper frame of the pressing machine; a cam holder to be fixed to the upper frame of the pressing machine, said cam holder and said sliding cam being combined for relative movement therebetween and to leave a predetermined space defined therebetween along a direction of sliding, thereby permitting said sliding cam to be slidably held in said cam holder; springs mounted between said cam holder and said sliding cam biasing said sliding cam toward an initial stress-free position; a spacer to be inserted in said predetermined space, and detachable fastening means to fix said sliding cam to said cam holder in a desired fixed position with said spacer in said predetermined space.

2. A cam assembly for use in a pressing machine according to claim 1, wherein said detachable fastening means include a bolt, a locking nut threaded on said bolt, and a stopper plate fixed to said cam holder, said stopper plate having tapped holes made therein for said bolt, said bolt pushing said sliding cam apart from the initial stress-free position to an upper dead end position, said locking nut on said bolt holding said sliding cam at the upper dead end position by locking the bolt to said stopper plate.

* * * * *